United States Patent
Urbach et al.

(10) Patent No.: US 11,467,018 B1
(45) Date of Patent: Oct. 11, 2022

(54) LIQUID SENSOR ASSEMBLY

(71) Applicant: ZF Active Safety and Electronics US LLC, Livonia, MI (US)

(72) Inventors: Brian Urbach, Rochester Hills, MI (US); Michael Bean, Saint Clair, MI (US); Nicholas Turovich, Rochester Hills, MI (US); Greg Zeug, Shelby Township, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 0 days.

(21) Appl. No.: 17/244,260

(22) Filed: Apr. 29, 2021

(51) Int. Cl.
*G01D 11/24* (2006.01)
*G01F 23/263* (2022.01)

(52) U.S. Cl.
CPC ......... *G01F 23/268* (2013.01); *G01D 11/245* (2013.01)

(58) Field of Classification Search
CPC .......................... G01F 23/268; G01D 11/245
See application file for complete search history.

(56) References Cited

U.S. PATENT DOCUMENTS

| 11,293,829 | B1 * | 4/2022 | Bean | G01D 11/245 |
| 2020/0393320 | A1 * | 12/2020 | Wutzler | G01M 3/045 |

FOREIGN PATENT DOCUMENTS

| CN | 205516918 U | * | 8/2016 | |
| DE | 102012218758 A1 | * | 4/2014 | ............ F02D 41/18 |
| DE | 112014002928 T5 | * | 3/2016 | ......... F02M 35/1038 |
| DE | 102015219509 A1 | * | 4/2017 | ............ G01D 11/24 |
| WO | WO-2012055622 A1 | * | 5/2012 | ........... F02D 41/187 |

* cited by examiner

*Primary Examiner* — Jamel E Williams
(74) *Attorney, Agent, or Firm* — Robert James Harwood

(57) ABSTRACT

A liquid sensor assembly includes a sensor housing defining an interior cavity. The sensor housing has at least one inlet opening for liquid to pass into the cavity and at least one outlet opening for liquid to pass out of the cavity. A liquid sensor is in the cavity for sensing the presence of liquid in the sensor housing. The liquid sensor is between the at least one inlet opening and the at least one outlet opening. The liquid sensor has a sensor opening extending therethrough for the passage of liquid through the liquid sensor.

19 Claims, 3 Drawing Sheets

US 11,467,018 B1

LIQUID SENSOR ASSEMBLY

FIELD OF THE INVENTION

The present invention is directed to a liquid sensor assembly and, more particularly, to a liquid sensor assembly having openings for receiving and draining liquids.

BACKGROUND OF THE INVENTION

Liquid in certain systems can cause the systems to degrade and/or be compromised. For example, water ingression in a steering system can lead to increased friction in the steering system. Although sensors for detecting the presence of liquid are known, they are not commonly used in steering systems. The steering systems, instead, utilize robust sealing solutions in their designs to keep water from entering the systems as a first line of defense. Known steering systems also utilize friction detection algorithms to deduce when a possible issue has occurred. These friction detection algorithms, however, have limitations.

SUMMARY OF THE INVENTION

According to one aspect, a liquid sensor assembly can include a sensor housing defining an interior cavity. The sensor housing can have at least one inlet opening for liquid to pass into the cavity and at least one outlet opening for liquid to pass out of the cavity. A liquid sensor can be in the cavity for sensing the presence of liquid in the sensor housing. The liquid sensor can be between the at least one inlet opening and the at least one outlet opening. The liquid sensor can have a sensor opening extending therethrough for the passage of liquid through the liquid sensor.

According to another aspect, alone or in combination with any other aspect, a steering system can include a steering system housing and the liquid sensor assembly. A portion of the sensor housing can extend through the steering system housing. The at least one inlet opening can be inside the steering system housing for liquid to pass from inside the steering system housing into the cavity. The at least one outlet opening can be outside the steering system housing for liquid to pass out of the cavity and drain from the steering system housing.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
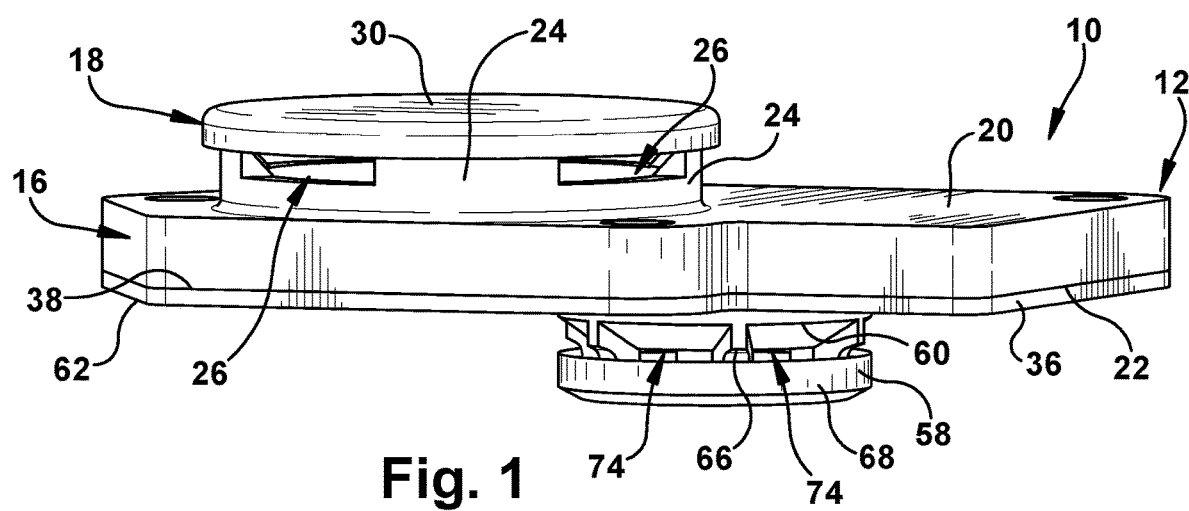
FIG. 1 is a schematic perspective side view of a liquid sensor assembly constructed in accordance with the present disclosure.
Figure 2:
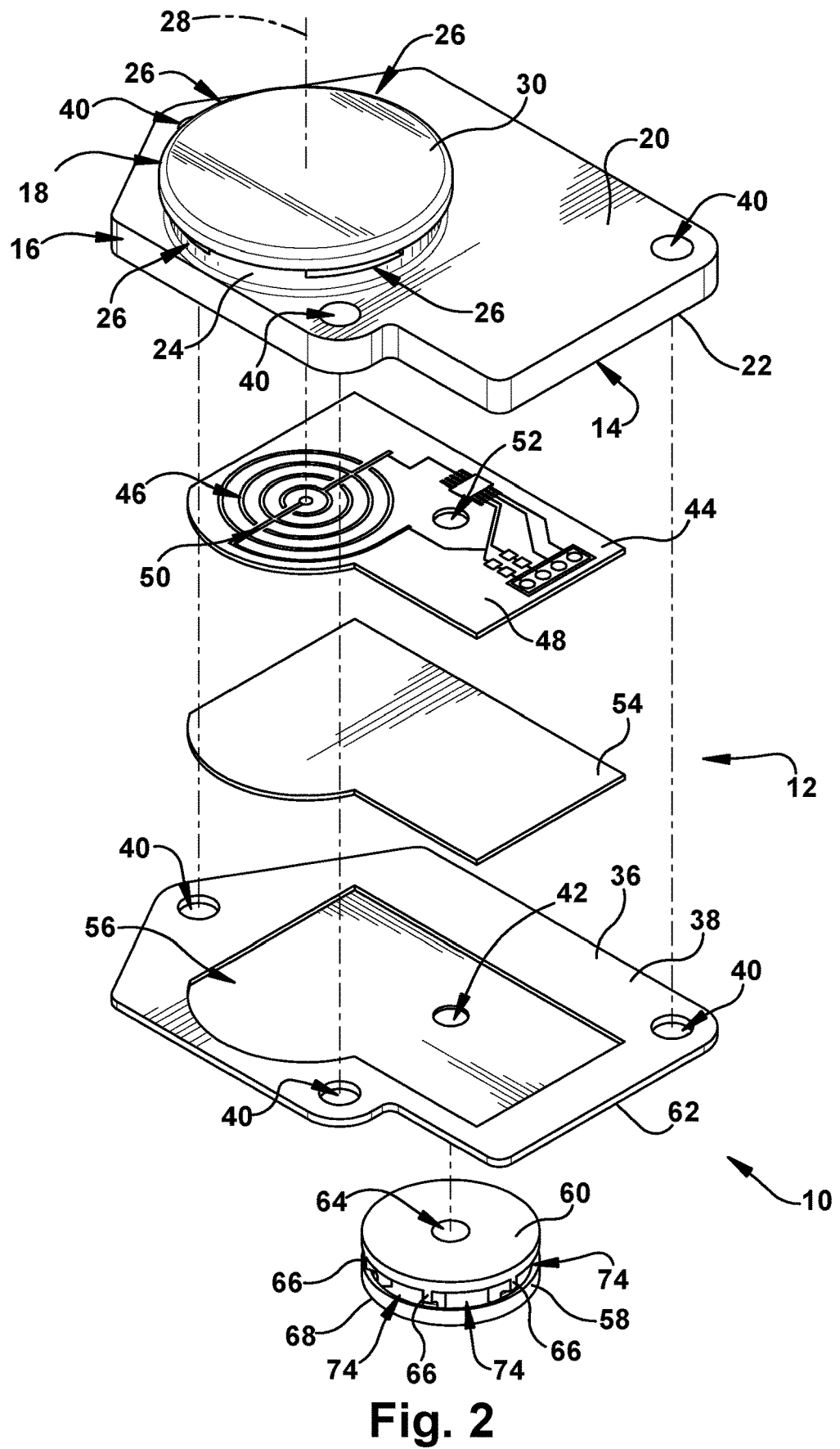
FIG. 2 is an exploded view of the liquid sensor assembly of FIG. 1.

A liquid sensor assembly 10 constructed in accordance with the present invention is shown in FIGS. 1-2. The liquid sensor assembly 10 includes a sensor housing 12 defining an interior cavity 14. The sensor housing 12 has first and second portions 16, 18 that may be formed as one piece. The first portion 16 has opposite first and second surfaces 20, 22. The second portion 18 includes at least one sidewall 24 that extends along an axis 28 from the first surface 20. In the example configuration shown in FIGS. 1-2, the second portion 18 includes one cylindrical sidewall 24. The second portion 18, however, can have any number of sidewalls 24 defining a variety of shapes.

A plurality of inlet openings 26 radially extend through the cylindrical sidewall 24 for the passage of liquid into the cavity 14. Although the cylindrical sidewall 24 is shown and described as having a plurality of inlet openings 26, the cylindrical sidewall can have only one inlet opening.

Figure 4:
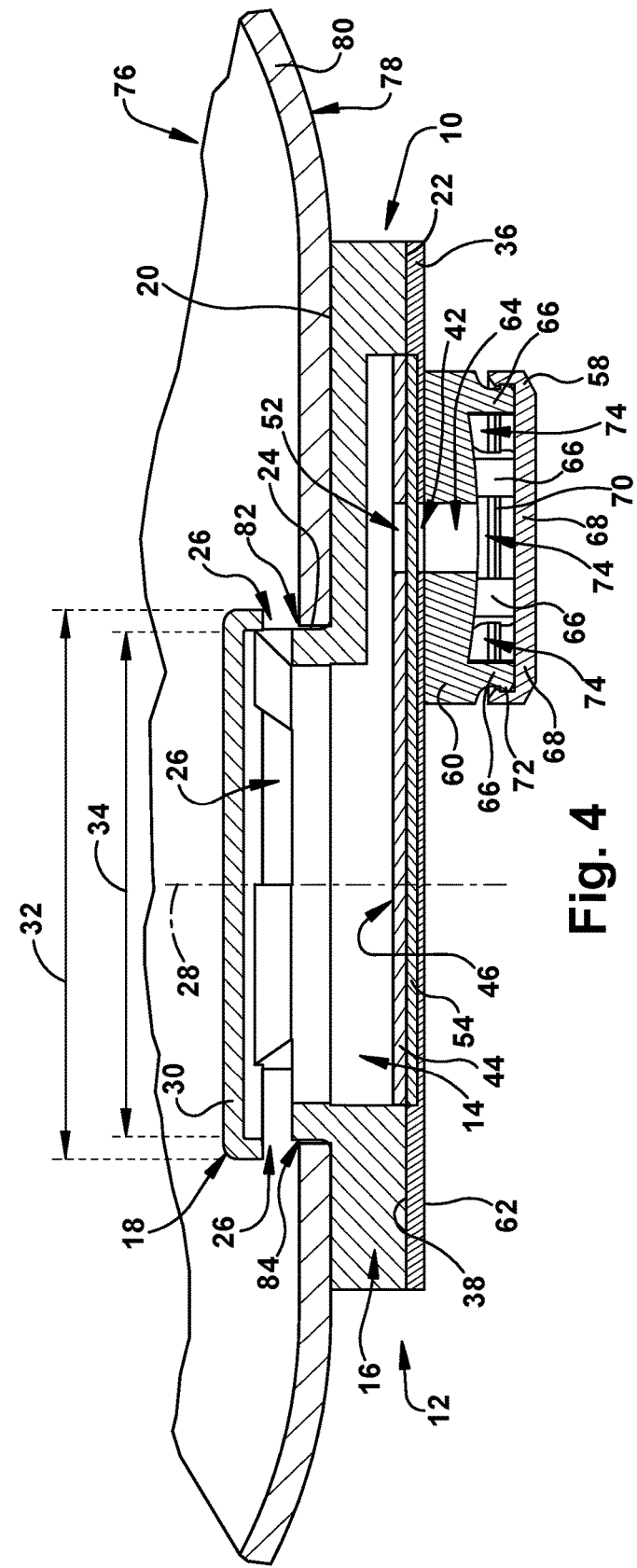
FIG. 4 is a schematic stepped cross-sectional view of an example use application for the liquid sensor assembly of FIG. 1.

The cylindrical sidewall 24 may extend along the axis 28 to a cap 30. As shown in FIGS. 1-2 and 4, a diameter 32 of the cap 30 may be greater than a diameter 34 of the cylindrical sidewall 24. In such a configuration, at least a portion of the cap 30 overhangs the cylindrical sidewall 24 and inlet openings 26. The cap 30 can also be free from openings that extend in the axial direction.

As shown in FIGS. 1-2, the sensor housing 12 also includes a cover 36 having a first surface 38 that engages the second surface 22 of the first portion 20 when secured to the first portion. The first portion 20 and the cover 36 may be secured to one another by fasteners. As shown in FIG. 2, the cover 36 and the first portion 20 have axially ending fastener openings 40 for receiving such fasteners. Alternatively, the cover 36 and the first portion 20 can be secured to one another in any other manner, such as through the use of adhesives. The cover 36, when secured to the first portion 20, helps define and enclose the cavity 14.

The cover 36 has an outlet opening 42 axially extending therethrough for liquid to drain out of the cavity 14. Although the cover 36 is shown as having one outlet opening 42, the cover can have any number of outlet openings.

A liquid sensor 44 in the cavity 14 includes a liquid sensing portion 46 on a substrate 48. The liquid sensing portion 46 may be formed from one or more capacitors 50 that are arranged on the substrate 48 and/or in the sensor housing 12 so that they intersect the axis 28. With such an arrangement, liquid flowing into the cavity 14 drops onto the one or more capacitors 50. The one or more capacitors 50 are configured such that liquid contact causes changes in their capacitance. Therefore, the liquid sensor 44 may detect the presence of liquid in the sensor housing 12 by measuring changes in capacitance at the one or more capacitors 50. The liquid sensor 44 may be electrically connected, such as by a wired or wireless connection, to other systems and/or controllers that may issue an alert when liquid is detected and/or cause operational changes when liquid is detected.

As shown in FIG. 2, the substrate 48 is positioned in the cavity 14 between the inlet and outlet openings 26, 42 and includes an axially extending sensor opening 52. The sensor opening 52 allows liquid to pass through the substrate 48 as the liquid flows from the inlet openings 26 to the outlet opening 42. The sensor opening 52 may be spaced from the liquid sensing portion 46 so that liquid flowing through the cavity 14 contacts the liquid sensing portion before flowing through the sensor opening. Although the substrate 48 is shown as having only one sensor opening 52, the substrate can have any number of sensor openings.

A liquid permeable membrane 54 may also be in the cavity 14. The membrane 54 is positioned between and engages the substrate 48 and the cover 36. The first surface 38 of the cover 36 may have a depression 56 therein that is configured to receive the membrane 54 and help hold the membrane in place. The membrane 54 is configured to permit liquid to flow toward the outlet opening 42, while preventing liquid from flowing toward the substrate 48 from the outlet opening. The membrane 54 thus helps ensure that the liquid detected by the liquid sensor 44 has entered the cavity through the inlet openings 26, not through the outlet opening 42.

Figure 3:
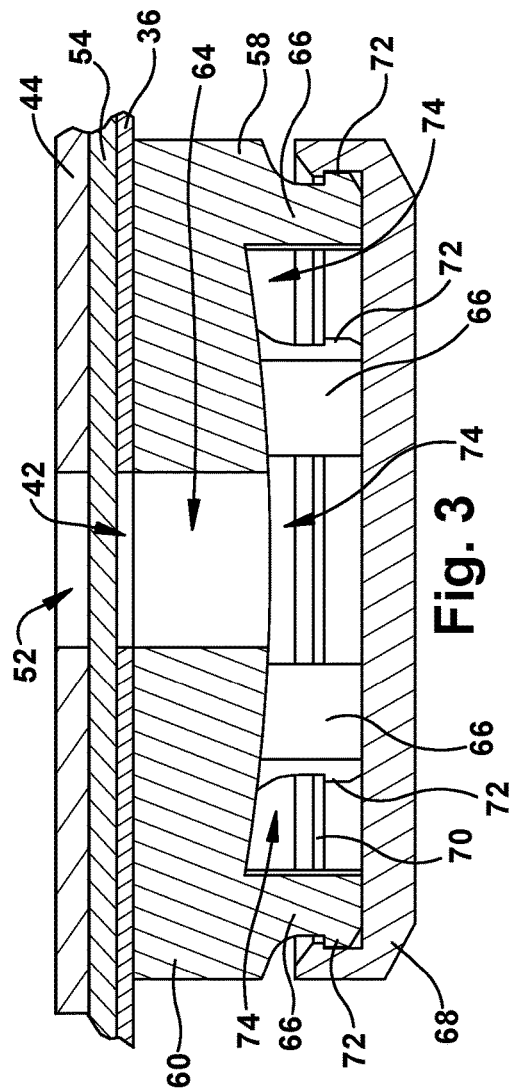
FIG. 3 is a schematic cross-sectional view of a portion of the liquid sensor assembly of FIG. 1.

As shown in FIGS. 1-3, the liquid sensor assembly 10 may include a bleeder valve 58. The bleeder valve 58 includes a base portion 60 connected to a second surface 62 of the cover 36. The base portion 60 may be formed with the cover 36 as one piece, or may be separately formed from the cover and attached thereto. The base portion 60 includes an inlet opening 64 axially extending therethrough and a plurality of axially extending resilient arms 66. When the base portion 60 is connected to the cover 36, the inlet opening 64 is aligned with the outlet opening 42 and the resilient arms 66 axially extend away from the second surface 62 of the cover 36.

The bleeder valve 58 further includes a bleeder cap 68 removably connected to the base portion 60. A radially extending interior flange 70 of the bleeder cap 68 snaps into the resilient arms 66 after sliding past ends 72 of the resilient arms to connect the bleeder cap to the base portion 60. The bleeder cap 68 may be free from axially extending openings. The bleeder cap 68 and base portion 60, however, define radially extending outlet openings 74 for liquid, which entered the bleeder valve 58 through the outlet opening 42 of the cover 36, to exit the bleeder valve and the liquid sensor assembly 10.

The liquid sensor assembly 10 may be used in any application for detecting the presence of liquid. FIG. 4 illustrates one example application for the liquid sensor assembly 10.

A portion of a steering system 76 for use in a vehicle 78 is shown in FIG. 4. The steering system 76 includes a steering system housing 80. The steering system housing 80 can contain multiple components of the steering system 76 that cause steerable vehicle wheels to turn when directed. For example, the steering system housing 80 can contain one or more pulleys, a timing belt for interconnecting the pulleys, and a push rod for deflecting the vehicle wheels.

The steering system housing 80 is designed having a lowest elevation point 82 to which liquid, when present inside the steering system housing, flows. The liquid sensor assembly 10 can be connected to the steering system housing 80 at the lowest elevation point 81. When connected, the cylindrical sidewall 24 extends through an opening 84 in the lowest elevation point 82 so that a portion of the cylindrical sidewall, the inlet openings 26 and the cap 30 are inside the steering system housing 80, while the remainder of the liquid sensor assembly 10 remains outside the steering system housing.

Water, when present in the steering system housing 80, flows toward the lowest elevation point 82. The flowing water enters the cavity 14 through the inlet openings 26 adjacent the lowest elevation point 82 and drops onto the liquid sensing portion 46. The liquid sensor 44 detects the presence at the liquid sensing portion 46. In turn, the liquid sensor 44 communicates to a driver of the vehicle 78 and/or to an electronic control unit ("ECU") within the vehicle the detected presence of water. Because the liquid sensor assembly 10 is configured so that only liquid that enters the cavity 14 from the steering system housing 80 is detected, the driver/ECU is notified that water is present in the steering system housing.

After being detected 44, the water drains out of the liquid sensor assembly 10 by passing through the sensor opening 52, the membrane 54, the outlet opening 42 of the cover 36, the inlet opening 64 of the bleeder valve 58 and the outlet openings 74 of the bleeder valve. Advantageously, the liquid sensor assembly 10 helps prolong the life of the components in the steering system housing 80 by permitting water in the steering system housing to drain out of the steering system housing instead of remaining in the steering system housing and further degrading the components. Additionally, the liquid sensor assembly 10 can be configured so that contaminants/debris carried by the flowing water can drain out of the liquid sensor assembly with the water to help prolong the life of the liquid sensor 44.

As another advantageous feature, the openings 26, 42, 52, 64, 74 and membrane 54 permit air to pass to and from the inside of the steering system housing 80 for pressure equalization in the steering system housing. The liquid sensor assembly 10 can thus function along with or in the place of a vent pill to equalize the pressure in the steering system housing 80.

From the above description of the invention, those skilled in the art will perceive improvements, changes and modifications. Such improvements, changes and modifications within the skill of the art are intended to be covered by the appended claims.

Having described the invention, the following is claimed:

1. A liquid sensor assembly, comprising:
    a sensor housing defining an interior cavity, the sensor housing including a first portion and a second portion that are formed as one piece, the second portion extending along an axis from a first surface of the first portion, a cover of the sensor housing engaging a second surface of the first portion and at least partially defining and enclosing the cavity when secured to the first portion, the first and second surfaces of the cover being opposite one another, the sensor housing having at least one inlet opening extending through the second portion for liquid to pass into the cavity and at least one outlet opening extending through the cover for liquid to pass out of the cavity; and
    a liquid sensor in the cavity for sensing the presence of liquid in the sensor housing, the liquid sensor being between the at least one inlet opening and the at least one outlet opening, the liquid sensor having a sensor opening extending therethrough for the passage of liquid through the liquid sensor.

2. The liquid sensor assembly recited in claim 1, further comprising a liquid permeable membrane in the cavity between the liquid sensor and the cover, the membrane being configured to permit liquid to flow toward the at least one outlet opening, while preventing liquid from flowing toward the liquid sensor from the at least one outlet opening.

3. The liquid sensor assembly recited in claim 1, wherein the liquid sensor includes a liquid sensing portion on a substrate, the liquid sensing portion intersecting the axis, the at least one sensor opening extending through the substrate.

4. The steering system recited in claim 3, wherein the liquid sensing portion is formed from one or more capacitors, the liquid sensor detecting the presence of liquid by measuring changes in capacitance at the one or more capacitors.

5. The liquid sensor assembly recited in claim 1, wherein the second portion of the sensor housing includes a cylindrical sidewall extending along the axis from the first surface of the first portion, the at least one inlet opening in the second portion radially extending through the cylindrical sidewall.

6. The liquid sensor assembly recited in claim 5, wherein the second portion of the sensor housing includes a cap, the cylindrical sidewall extending along the axis from the cap to the first surface of the first portion, a diameter of the cap being greater than a diameter of the of the cylindrical sidewall.

7. The liquid sensor assembly recited in claim 6, wherein the cap is free from openings that extend in the direction of the axis.

8. The liquid sensor assembly recited in claim 7, further comprising a bleeder valve having a base portion connected to the cover, the base portion having at least one inlet opening aligned with the at least one outlet opening of the cover and a plurality of resilient arms extending away from the cover.

9. The liquid sensor assembly recited in claim 8, wherein the bleeder valve further comprises a bleeder cap removably connected to the base portion, the bleeder cap having an interior flange that snaps into the resilient arms to connect the bleeder cap to the base portion, the connected bleeder cap and base portion defining at least one outlet opening in the bleeder valve for liquid, which entered the bleeder valve through the at least one outlet opening of the cover, to exit the bleeder valve and the liquid sensor assembly.

10. The liquid sensor assembly recited in claim 9, wherein the at least one outlet opening of the cover extends in an axial direction, the bleeder cap being free from axially extending openings.

11. A steering system, comprising:
a steering system housing; and
a liquid sensor assembly including
a sensor housing defining an interior cavity, a portion of the sensor housing extending through the steering system housing, the sensor housing having at least one inlet opening inside the steering system for liquid to pass from inside the steering system housing into the cavity, the sensor housing having at least one outlet opening outside the steering system housing for liquid to pass out of the cavity and drain from the steering system housing, and
a liquid sensor in the cavity for sensing the presence of liquid in the sensor housing, the liquid sensor being between the at least one inlet opening and the at least one outlet opening, the liquid sensor having a sensor opening extending therethrough for the passage of liquid through the liquid sensor.

12. The steering system recited in claim 11, further comprising a liquid permeable membrane in the cavity between the liquid sensor and the at least one outlet opening, the membrane being configured to permit liquid to flow toward the at least one outlet opening, while preventing liquid from flowing toward the liquid sensor from the at least one outlet opening.

13. The steering system recited in claim 12, wherein the openings and membrane permit air to pass to and from the inside of the steering system housing for pressure equalization in the steering system housing.

14. The steering system recited in claim 11, wherein the sensor housing includes:
a first portion having opposite first and second surfaces, the first portion being outside the steering system housing;
a second portion formed as one piece with the first portion, the second portion extending along an axis from the first surface of the first portion, the second portion extending through an opening in the steering system housing so that the second portion is at least partially inside the steering system housing, the at least one inlet opening extending through the second portion; and
a cover at least partially defining and enclosing the cavity, the cover engaging the second surface of the cover when secured to the first portion, the cover being outside the steering system housing and having the at least one outlet opening extending therethrough.

15. The steering system recited in claim 14, wherein the second portion of the sensor housing includes a cylindrical sidewall extending along the axis from the first surface of the first portion, the cylindrical sidewall extending through the opening in the steering system housing, the at least one inlet opening in the second portion radially extending through the cylindrical sidewall.

16. The steering system recited in claim 15, wherein the second portion of the sensor housing includes a cap, the cylindrical sidewall extending along the axis from the cap to the first surface of the first portion, a diameter of the cap being greater than a diameter of the of the cylindrical sidewall.

17. The steering system recited in claim 16, wherein the cap is free from openings that extend in the direction of the axis.

18. The steering system recited in claim 14, further comprising a bleeder valve including:
a base portion connected to the cover, the base portion having at least one inlet opening aligned with the at least one outlet opening of the cover and a plurality of resilient arms extending away from the cover; and
a bleeder cap removably connected to the base portion, the bleeder cap being free from axially extending openings;
the bleeder cap and base portion defining at least one outlet opening in the bleeder valve for liquid, which entered the bleeder valve through the at least one outlet opening of the cover, to exit the bleeder valve and the liquid sensor assembly to an area outside the steering system housing.

19. A liquid sensor assembly, comprising:
a sensor housing defining an interior cavity, the sensor housing having at least one inlet opening for liquid to pass into the cavity and at least one outlet opening for liquid to pass out of the cavity, the sensor housing including a cover that at least partially defines and encloses the cavity, the at least one outlet opening extending through the cover;
a liquid sensor in the cavity for sensing the presence of liquid in the sensor housing, the liquid sensor being between the at least one inlet opening and the at least one outlet opening, the liquid sensor having a sensor opening extending therethrough for the passage of liquid through the liquid sensor; and
a liquid permeable membrane in the cavity between the liquid sensor and the cover, the membrane being configured to permit liquid to flow toward the at least one outlet opening, while preventing liquid from flowing toward the liquid sensor from the at least one outlet opening.

* * * * *